US007258611B2

(12) United States Patent
Bigelow, Jr. et al.

(10) Patent No.: US 7,258,611 B2
(45) Date of Patent: Aug. 21, 2007

(54) GAMING DEVICE HAVING FREE GAME BONUS WITH A CHANGING MULTIPLIER

(75) Inventors: Robert F. Bigelow, Jr., Reno, NV (US); James A. Vasquez, Carson City, NV (US); Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/086,146

(22) Filed: Feb. 28, 2002

(65) Prior Publication Data

US 2003/0162585 A1 Aug. 28, 2003

(51) Int. Cl.
*A63F 13/00* (2006.01)
*A63F 13/99* (2006.01)

(52) U.S. Cl. ............................ 463/25; 463/16; 463/20

(58) Field of Classification Search ............ 463/16–22, 463/39, 25; 273/138.1

See application file for complete search history.

(56) References Cited

U.S. PATENT DOCUMENTS

| | | | |
|---|---|---|---|
| 4,624,459 | A | 11/1986 | Kaufman |
| 4,991,848 | A | 2/1991 | Greenwood et al. |
| 5,342,047 | A | 8/1994 | Heidel et al. |
| 5,393,057 | A | 2/1995 | Marnell, II |
| 5,407,200 | A | 4/1995 | Zalabak |
| 5,423,539 | A | 6/1995 | Nagao |
| 5,449,173 | A | 9/1995 | Thomas et al. |
| 5,456,465 | A | 10/1995 | Durham |
| 5,560,603 | A | 10/1996 | Seelig et al. |
| 5,647,798 | A | 7/1997 | Falciglia |
| 5,722,891 | A | 3/1998 | Inoue |
| 5,732,948 | A | 3/1998 | Yoseloff |
| 5,772,506 | A | 6/1998 | Marks et al. |

(Continued)

FOREIGN PATENT DOCUMENTS

| | | |
|---|---|---|
| AU | 199716432 B2 | 9/1997 |

(Continued)

OTHER PUBLICATIONS

Cash Crop Brochure written by Arist O Crat Leisure Industries, published in 1997.

(Continued)

*Primary Examiner*—Robert E. Pezzuto
*Assistant Examiner*—Robert Mosser
(74) *Attorney, Agent, or Firm*—Bell, Boyd & Lloyd LLP

(57) ABSTRACT

The present invention includes an apparatus and method for a bonus game, and particularly a free spin bonus with an incrementing multiplier. The bonus game includes a plurality of reels having a plurality of symbols and multipliers. The gaming device provides a number of free spins to the player at the beginning of the bonus game. The multiplier preferably starts at "1×" and increases by one after each free spin. Initially, the player spins the reels attempting to obtain a winning symbol combination on the reels. If the player obtains a winning combination, the gaming device provides an award. The award is multiplied by the multiplier and the player receives the multiplied award for that free spin. The player continues to spin the reels until there are no free spins remaining in the bonus game.

46 Claims, 8 Drawing Sheets

U.S. PATENT DOCUMENTS

| | | | |
|---|---|---|---|
| 5,775,692 A | 7/1998 | Watts et al. | |
| 5,823,874 A | 10/1998 | Adams | |
| 5,833,537 A | 11/1998 | Barrie | |
| 5,848,932 A | 12/1998 | Adams | |
| 5,855,514 A | 1/1999 | Kamille | |
| 5,882,261 A | 3/1999 | Adams | |
| 5,918,880 A | 7/1999 | Voigt, IV et al. | |
| 5,919,088 A | 7/1999 | Weiss | |
| 5,935,002 A | 8/1999 | Falciglia | |
| 5,964,463 A | 10/1999 | Moore, Jr. | |
| 5,971,849 A | 10/1999 | Falciglia | |
| 5,980,384 A | 11/1999 | Barrie | |
| 5,988,638 A | 11/1999 | Rodesch et al. | |
| 6,003,867 A | 12/1999 | Rodesch et al. | |
| 6,004,207 A * | 12/1999 | Wilson et al. | 463/20 |
| 6,012,982 A | 1/2000 | Piechowiak et al. | |
| 6,059,289 A | 5/2000 | Vancura | |
| 6,089,978 A | 7/2000 | Adams | |
| 6,102,400 A | 8/2000 | Scott et al. | |
| 6,117,009 A | 9/2000 | Yaseloff | |
| 6,142,873 A | 11/2000 | Weiss et al. | |
| 6,149,521 A | 11/2000 | Sanduski | |
| 6,159,097 A | 12/2000 | Gura | |
| 6,173,955 B1 | 1/2001 | Perrie et al. | |
| 6,174,233 B1 | 1/2001 | Sunaga et al. | |
| 6,190,254 B1 | 2/2001 | Bennett | |
| 6,203,429 B1 | 3/2001 | Demar et al. | |
| 6,220,959 B1 | 4/2001 | Holmes, Jr. et al. | |
| 6,224,483 B1 | 5/2001 | Mayeroff | |
| 6,231,442 B1 | 5/2001 | Mayeroff | |
| 6,234,897 B1 | 5/2001 | Frohm et al. | |
| 6,238,288 B1 | 5/2001 | Walker et al. | |
| 6,270,409 B1 | 8/2001 | Shuster | |
| 6,270,411 B1 | 8/2001 | Gura et al. | |
| 6,305,686 B1 * | 10/2001 | Perrie et al. | 273/146 |
| 6,309,300 B1 | 10/2001 | Glavich | |
| 6,311,976 B1 | 11/2001 | Yoseloff et al. | |
| 6,312,334 B1 | 11/2001 | Yoseloff | |
| 6,315,660 B1 | 11/2001 | DeMar et al. | |
| 6,315,663 B1 | 11/2001 | Sakamoto | |
| 6,328,649 B1 | 12/2001 | Randall et al. | |
| 6,334,814 B1 | 1/2002 | Adams | |
| 6,340,158 B2 | 1/2002 | Pierce et al. | |
| 6,347,996 B1 | 2/2002 | Gilmore et al. | |
| 6,364,768 B1 | 4/2002 | Acres et al. | |
| 6,394,902 B1 | 5/2002 | Glavich et al. | |
| 6,398,218 B1 | 6/2002 | Vancura | |
| 6,398,644 B1 | 6/2002 | Perrie et al. | |
| 6,406,369 B1 | 6/2002 | Baerlocher et al. | |
| 6,413,160 B1 | 7/2002 | Vancura | |
| 6,416,408 B2 | 7/2002 | Tracy et al. | |
| 6,419,579 B1 | 7/2002 | Bennett | |
| 6,435,511 B1 | 8/2002 | Vancura et al. | |
| 6,443,452 B1 | 9/2002 | Brune | |
| 6,454,651 B1 | 9/2002 | Yoseloff | |
| 6,471,208 B2 | 10/2002 | Yoseloff et al. | |
| 6,481,713 B2 | 11/2002 | Perrie et al. | |
| 6,491,584 B2 | 12/2002 | Graham et al. | |
| 6,506,118 B1 | 1/2003 | Baerlocher et al. | |
| 6,514,141 B1 | 2/2003 | Kaminkow et al. | |
| 6,537,150 B1 | 3/2003 | Luciano et al. | |
| 6,537,152 B2 | 3/2003 | Seelig et al. | |
| 6,561,904 B2 * | 5/2003 | Locke et al. | 463/25 |
| 6,565,436 B1 | 5/2003 | Baerlocher | |
| 6,602,137 B2 | 8/2003 | Kaminkow et al. | |
| 6,604,740 B1 | 8/2003 | Singer et al. | |
| 6,638,164 B2 | 10/2003 | Randall et al. | |
| 6,719,630 B1 | 4/2004 | Seelig et al. | |
| 6,733,389 B2 | 5/2004 | Webb et al. | |
| 6,805,349 B2 | 10/2004 | Baerlocher et al. | |
| 6,869,360 B2 | 3/2005 | Marks et al. | |
| 6,913,532 B2 | 7/2005 | Baerlocher et al. | |
| 6,921,335 B2 | 7/2005 | Rodgers et al. | |
| 6,955,600 B2 | 10/2005 | Glavich et al. | |
| 6,971,954 B2 | 12/2005 | Randall et al. | |
| 7,147,559 B2 * | 12/2006 | Englman | 463/25 |
| 2001/0009865 A1 | 7/2001 | Demar et al. | |
| 2002/0010017 A1 | 1/2002 | Bennett | |
| 2003/0060272 A1 | 3/2003 | Glavich et al. | |
| 2003/0073483 A1 | 4/2003 | Glavich et al. | |
| 2005/0049035 A1 | 3/2005 | Baerlocher et al. | |
| 2005/0266917 A1 | 12/2005 | Glavich et al. | |

FOREIGN PATENT DOCUMENTS

| | | |
|---|---|---|
| AU | A-50327/96 | 10/1997 |
| AU | A-63553/98 | 10/1998 |
| AU | 778685 | 4/2005 |
| EP | 0688002 A1 | 12/1995 |
| EP | 0 798 676 A1 | 10/1997 |
| EP | 0874337 A1 | 10/1998 |
| EP | 0926645 A2 | 6/1999 |
| EP | 0 945 837 A2 | 9/1999 |
| EP | 0944030 A2 | 9/1999 |
| EP | 0 981 119 A2 | 2/2000 |
| EP | 0984409 A2 | 8/2000 |
| GB | 2 322 217 A | 8/1998 |
| GB | 2 328 311 A | 2/1999 |
| WO | WO 0012186 | 3/2000 |
| WO | WO 00/32286 | 6/2000 |
| WO | WO 01/26019 A1 | 4/2001 |

OTHER PUBLICATIONS

Money Mouse Brochure written by Arist O Crat Leisure Industries, published in 1997.

X Factor Brochure and Website Page written by WMS Gaming, Inc., published in 1998.

American Thunder Screen Shots written by IGT, published in 1998.

Polly & Roger Brochure written by VLC, Inc, published in 2000.

Top Cat Brochure written by WMS Gaming, Inc., published prior to 2001.

Treasure Tunnel, Treasure Wheel Brochure written by Sigma Game, Inc., published prior to 2001.

Bonus Times written by Bally Gaming, published in 2000.

Money Grab (website) written by www.wmsgaming.com, printed May 22, 2001.

Leopard Spots™ (website) written by www.igt.com, printed Mar. 21, 2001.

Mega Multiplier® (website) written by www.wmsgaming.com, printed May 22, 2001.

Vision Series™/Good Times™ written by IGT, published in 1999.

3-Way Action Poker Brochure and Article written by written by IGT, published in 2002.

Addams Family Advertisement and Article written by IGT, Strictly Slots, published in 2000.

Bally Slot Machines Electro-Mechanicals 1964-1980 Book, Revised 3rd Edition [In Part] written by Marshall Fey.

Cuckoo Aristocrat Brochure written by Aristocrat, published in Feb. 1998.

DoubleBucks Brochure written by IGT (not dated).

Field Testing New Slots Article, written by Strictly Slots, published in Jul. 2000.

Take Your Pick Article written by Strictly Slots, published in Mar. 2001.

Yahtzee Video Game Advertisement, written by Mikohn Winning Solutions Worldwide, published 1999.

Catch A Wave Advertisement written by IGT, published in Dec. 2000.

Dolphin Treasure Advertisement written by Aristocrat Leisure Industries Pty., Ltd., published in 1996.

Spin Til You Win Game Description written by IGT, published in 1996.

* cited by examiner

GAMING DEVICE HAVING FREE GAME BONUS WITH A CHANGING MULTIPLIER

CROSS REFERENCE TO RELATED APPLICATIONS

This application is related to the following commonly-owned patent applications "GAMING DEVICE HAVING MULTIPLE AWARD ENHANCING LEVELS," Ser. No. 09/626,720, "GAMING DEVICE HAVING SEPARATELY CHANGEABLE VALUE AND MODIFIER BONUS SCHEME," Ser. No. 09/626,045, "GAMING DEVICE HAVING MULTIPLE AWARD ENHANCING LEVELS," Ser. No. 09/967,016, "GAMING DEVICE HAVING MULTIPLE AWARD ENHANCING LEVELS," Ser. No. 09/966,956, "GAMING DEVICE WITH BONUS SCHEME HAVING MULTIPLE AWARD LEVELS," Ser. No. 09/602,140, "GAMING DEVICE HAVING A RE-TRIGGER SYMBOL BONUS SCHEME," Serial No. 09/981,133 now U.S. Pat. No. 6,913,532: "GAMING DEVICE HAVING REGENERATING MULTIPLE AWARD OPPORTUNITIES," Ser. No. 09/960,784, "GAMING DEVICE HAVING A BONUS GAME WITH MULTIPLE PLAYER SELECTABLE AWARD OPPORTUNITIES," Ser. No. 10/237,207, "GAMING DEVICE HAVING A RE-TRIGGERING SYMBOL BONUS SCHEME WITH A BONUS SYMBOL ACCUMULATOR," Ser. No. 10/071,441, "GAMING DEVICE INCLUDING A GAME HAVING PLAYER SELECTED FUNCTION BASED ON SYMBOLS IN A FREE SPINS GAME," Ser. No. 10/243,052, "GAMING DEVICE HAVING A PROBABILITY ENHANCING TRIGGER SYMBOL," Ser. No. 10/241,255, "GAMING DEVICE INCLUDING A GAME HAVING A WILD SYMBOL RELATED AWARD," Ser. No. 10/633,391, "GAMING DEVICE HAVING A PROBABILITY-ENHANCING TRIGGER SYMBOL," Ser. No. 10/661,443, "GAMING DEVICE HAVING A BONUS GAME WITH MULTIPLE PLAYER SELECTABLE AWARD OPPORTUNITIES," Ser. No. 10/660,076, "GAMING DEVICE HAVING A FREE SPIN GAME," Ser. No. 10/953,812, "GAMING DEVICE HAVING SEQUENTIAL ACTIVATIONS OF A GAME AND REPLAY OF PREVIOUS ACTIVATIONS OF THE GAME," Ser. No. 10/956,508, "GAMING DEVICE WITH CHANGING WILD SYMBOLS," Ser. No. 10/956,303, "GAMING DEVICE HAVING FREE SPIN MODE WITH SYMBOL ELIMINATION," Ser. No. 10/953,818, "GAMING DEVICE HAVING A RE TRIGGERING SYMBOL BONUS SCHEME WITH A BONUS SYMBOL ACCUMULATOR AND PLAYER SELECTION OF ACCUMULATION TOTAL," Ser. No. 10/952,656, and "GAMING DEVICE HAVING A RE-TRIGGER SYMBOL BONUS SCHEME," Ser. No. 11/156,112,

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a free game bonus with a multiplier that changes for each free game.

BACKGROUND OF THE INVENTION

Gaming machine manufacturers constantly strive to make gaming machines that maximize enjoyment and excitement for players. Providing a bonus game in which a player has an opportunity to win potentially large awards or credits in addition to the awards associated with the base game of the gaming machine is one way to enhance player enjoyment and excitement.

Known gaming devices having bonus games employ a triggering event that occurs during play of the base game of the gaming device. The triggering event temporarily stalls or halts the base game play and enables a player to enter a second, different game, which is the bonus game. The player plays the bonus game, likely receives an award, and returns to the base game.

Bonus games that provide players with large awards or the potential to win large awards are especially attractive to players. One way that gaming device manufacturers provide larger or more frequently occurring awards in slot gaming machines is by providing free spins to a player. Several known games provide players a number of free spins at the beginning of the game and spin the reels to obtain awards. This type of bonus game is described in European Patent Application No. EP 0874337A1 and European Patent No. EP 0984409A2. These games are generally versions of a "Spin Until" type bonus game.

EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and to receive several awards. If the player does not obtain a winning symbol combination, the bonus game ends and the player receives the total accumulated awards for the bonus game. Thus, the player spins the reels in the bonus game until they do not obtain a winning combination.

EP 0984409A2 discloses a gaming device wherein the game enables the player to spin a plurality of reels having various symbols attempting to obtain awards. In this bonus game, the player starts the bonus game with a limited number of spins. The player spins the reels until there are no spins remaining. The player receives an award after each spin. The final award in the bonus game is the total of all of the awards accumulated by the player in the game.

Another way that gaming device manufacturers provide larger awards to players is by using multipliers. A multiplier increases the award amount proportionally to the value of the multiplier. For example, a "2×" multiplier pays twice the normal award value. A "3×" multiplier pays three times the normal award value. A multiplier can substantially increase a player's award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a multiplier symbol, the award is multiplied by the multiplier. Once an award is multiplied by the multiplier, the multiplier resets to a predetermined level.

Another type of bonus game that includes a multiplied payout is the "GOOD TIMES" gaming device which is manufactured by the assignee of this patent application. This game includes three reels having a plurality of symbols and blank spaces. The symbols include a plurality of "Good Times" symbols. The bonus includes two multiplier groups. A first multiplier group starts at "1×" (or one times the award) and goes up to "12×" (or twelve times the award). The second multiplier group starts at "1×" and goes up to "144×" (or one hundred forty-four times the award). Each time a player spins the reels and obtains three blank spaces on a payline, the designated multiplier in each multiplier increments one level. When the player obtains a winning combination, the player receives an award. If a "Good Times" symbol appears in the winning combination, the player's award is multiplied by the designated multiplier in the first bonus table. If two "Good Times" symbols appear in the winning combination, the player's award is multiplied by the designated multiplier in the second bonus group.

It should be appreciated that multipliers may substantially elevate award returns and increase player excitement and enjoyment. Players enjoy playing for high bonus awards. Thus, it is desirable to have a bonus game of a gaming device that provides several opportunities to play a bonus game and has the potential to accumulate large awards.

SUMMARY OF THE INVENTION

The present invention relates in general to a gaming device having a bonus game or scheme, and more particularly to a gaming device having a bonus game or scheme including a plurality of reels, a plurality of symbols on the reels, a plurality of free spins of the reels and a plurality of multipliers associated with the free spins.

In one embodiment, the gaming device provides the player with a plurality of free spins of the reels in the bonus game. A multiplier is associated with each spin of the reels. The multiplier changes and preferably increases after each spin. The processor in the gaming device spins the reels and determines if the player obtains an award based on the combination of symbols on the reels. If the player obtains an award, the award is modified by the multiplier associated with that spin of the reels. In another embodiment, a consolation award is provided to the player if the player does not receive an award after a spin of the reels. In a further embodiment, an accumulated award is provided to the player after there are no spins remaining in the game. The accumulated award may include a plurality of the awards provided to the player or all of the awards provided to the player during the game.

In one embodiment, the multiplier increases by one after each spin. In other embodiments, the multiplier increases by more than one or as desired by the game implementor. In other embodiments, the increase of the multiplier is randomly determined. In one alternative embodiment, the multiplier increases after non-winning games.

In one embodiment, a plurality of reels having several symbols are displayed to a player. The multiplier is also displayed to the player. The player starts the game with a predetermined number of spins in the game. The number of spins may be determined randomly, predefined or picked by playing a sub-game such as by having the player choose from a plurality of masked selections each having an associated number of spins. To start the bonus game, the processor spins or enables the player to initiate a spin of the reels attempting to obtain an award based on a combination of symbols on the reels. If the player obtains an award, the award is modified by the related multiplier. In one embodiment, the multiplier starts at 1× for the first spin and increases with each spin. After each spin, the multiplier is incrementally increased by one. Therefore, each subsequent spin has a larger multiplier. The player continues to spin the reels until there are no spins remaining.

In another embodiment, the gaming device provides the player with additional spins based upon the occurrence of one or more symbols on the reels.

In a further embodiment, the plurality of reels includes a plurality of symbols including at least one, and preferably a plurality of incrementor symbols. The multiplier changes and preferably increases (such as by one) each time the incrementor symbol appears on the display or on a payline associated with the reels. In another alternative embodiment, if one or more incrementor symbols are displayed by the reels, the multiplier increases by the number of incrementor symbols that are displayed on the reels.

In one embodiment, the multiplier of the present invention is employed in a poker game. In another embodiment, the multiplier of the present invention is employed in a keno game.

In one alternative embodiment, the multiplier is predetermined by the processor at the beginning of the bonus game. Then, the multiplier may increase by a predetermined amount or a random amount after each game.

In another alternative embodiment, the multiplier is randomly determined at the beginning of the bonus game and then randomly determined after each subsequent game. The processor or player may select the new multiplier. In one embodiment, the gaming device displays a plurality of player selectable selections to the player. The selections are masked or hidden from the player and when selected, display a multiplier to the player. The multipliers are randomly associated with the selections. The player may pick one or a plurality of selections. In another embodiment, the selections are only displayed to the player after a specific symbol combination occurs on the reels.

In one alternative embodiment, a light display is mounted to the gaming device and displays the multiplier to the player after the processor randomly selects the multiplier.

In another alternative embodiment, different increases of the multiplier and different probabilities are associated with different incrementor symbols such that one incrementor symbol has a greater probability of appearing on the reels than another incrementor symbol.

In an alternative embodiment, there is a weighted probability of increasing the multiplier by more than one.

It is therefore an advantage of the present invention to provide a gaming device having a free game bonus with a multiplier that increments after each game.

Another advantage of the present invention to provide a gaming device including a multiplier that increments after each game to provide larger awards to players.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
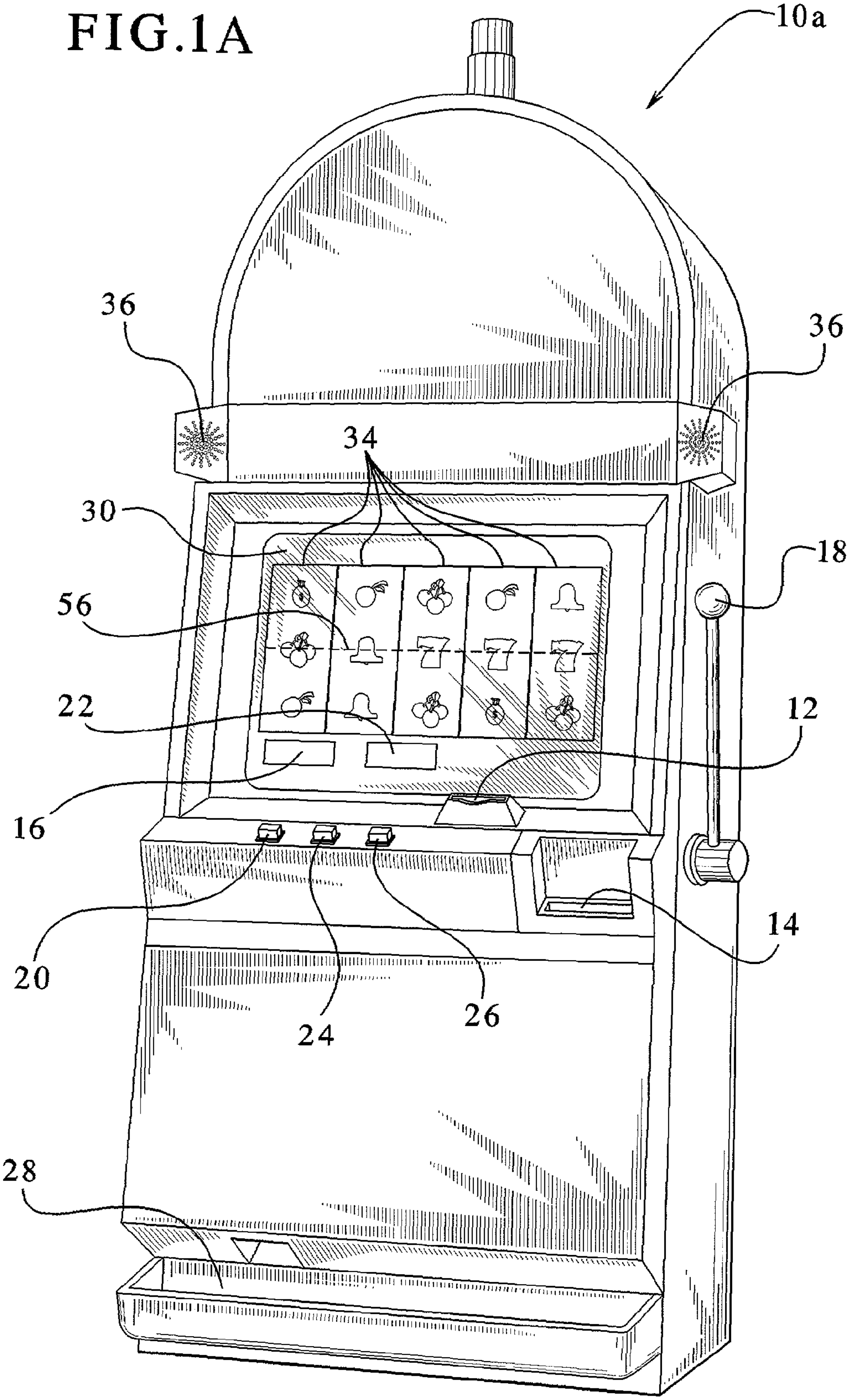
FIG. 1A is a front perspective view of one embodiment of the gaming device of the present invention.
Figure 1B:
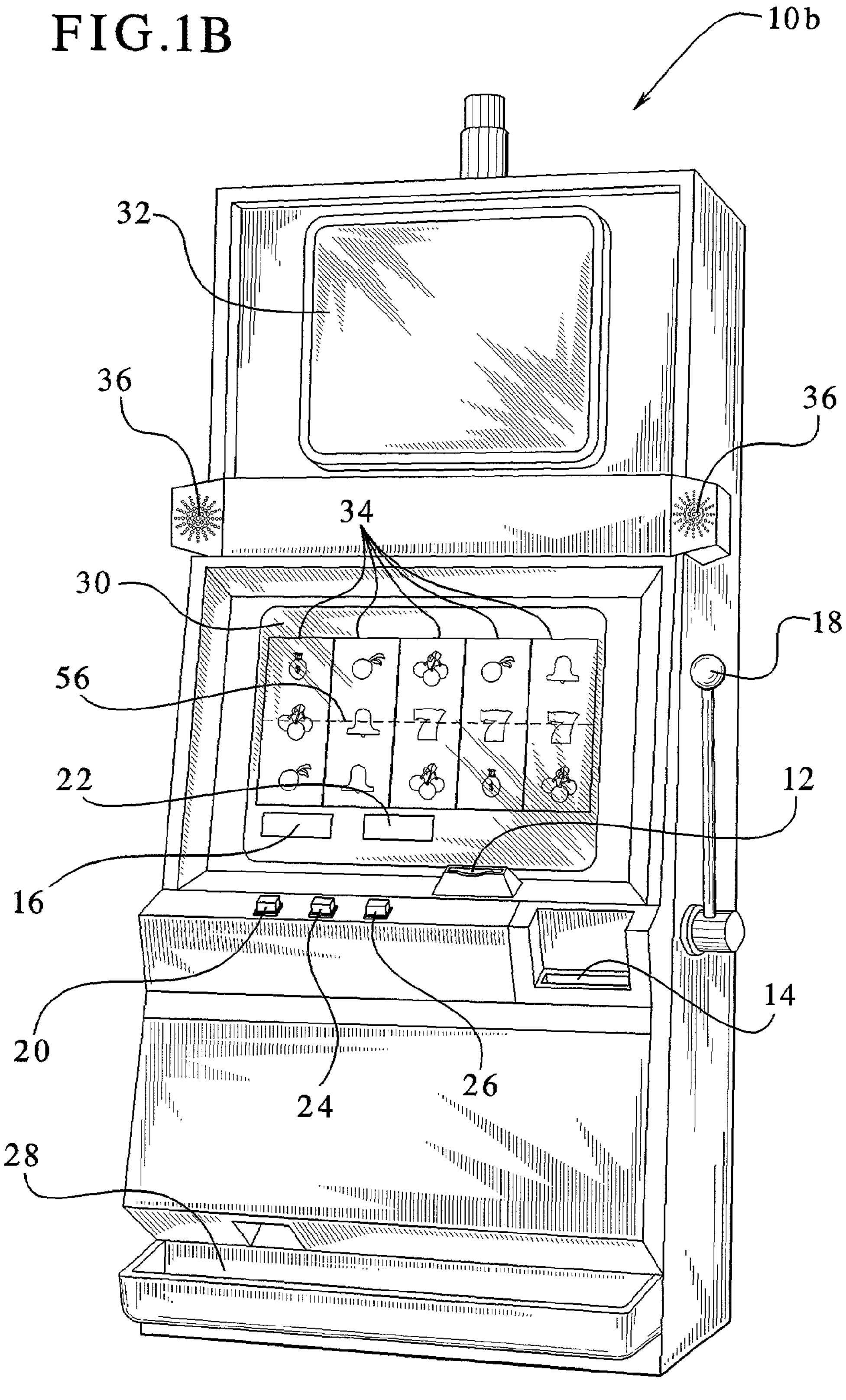
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is, in one embodiment, a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a handheld video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of the bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34, such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
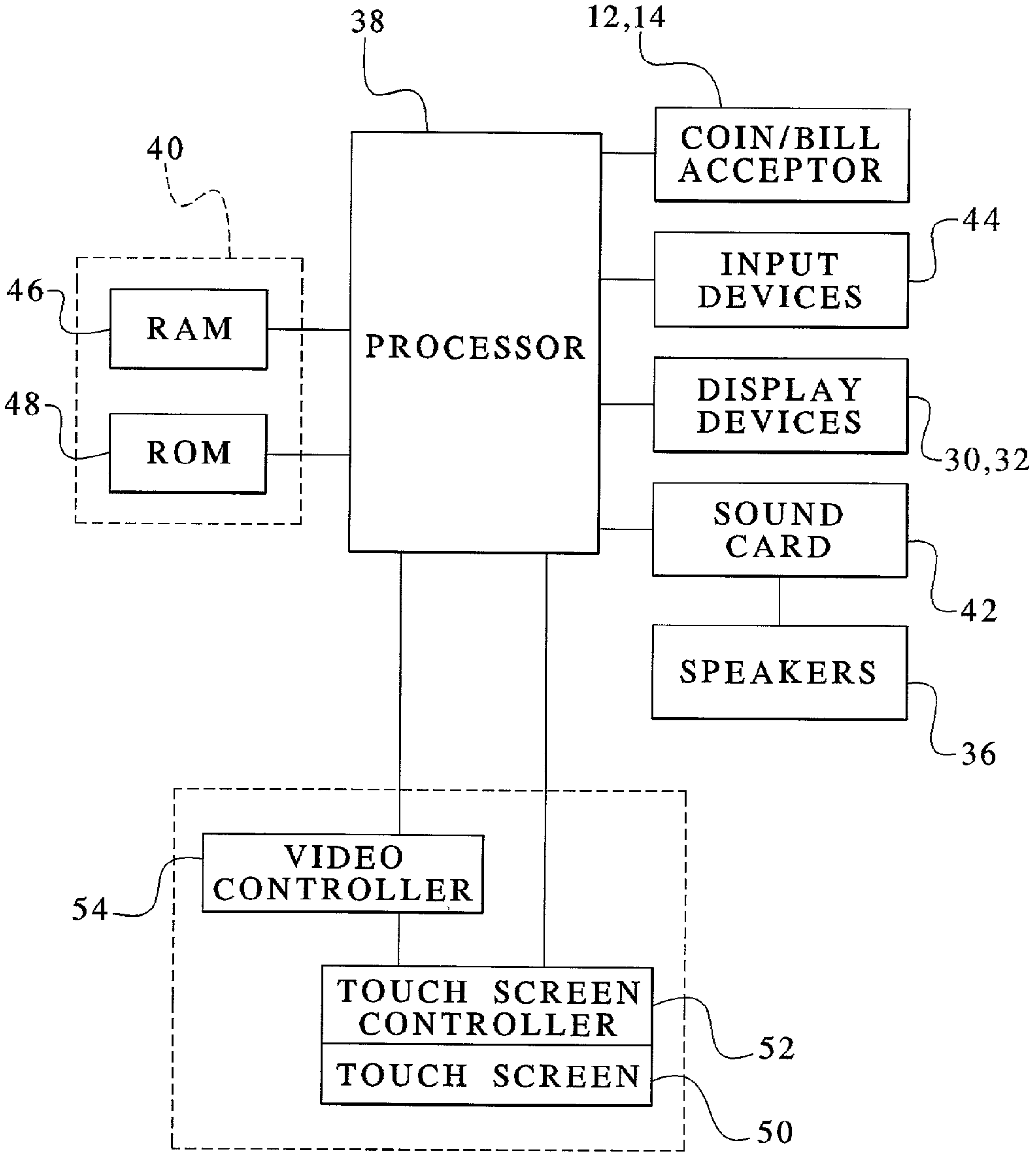
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively, and/or individually, referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Free Game Bonus

Figure 3:
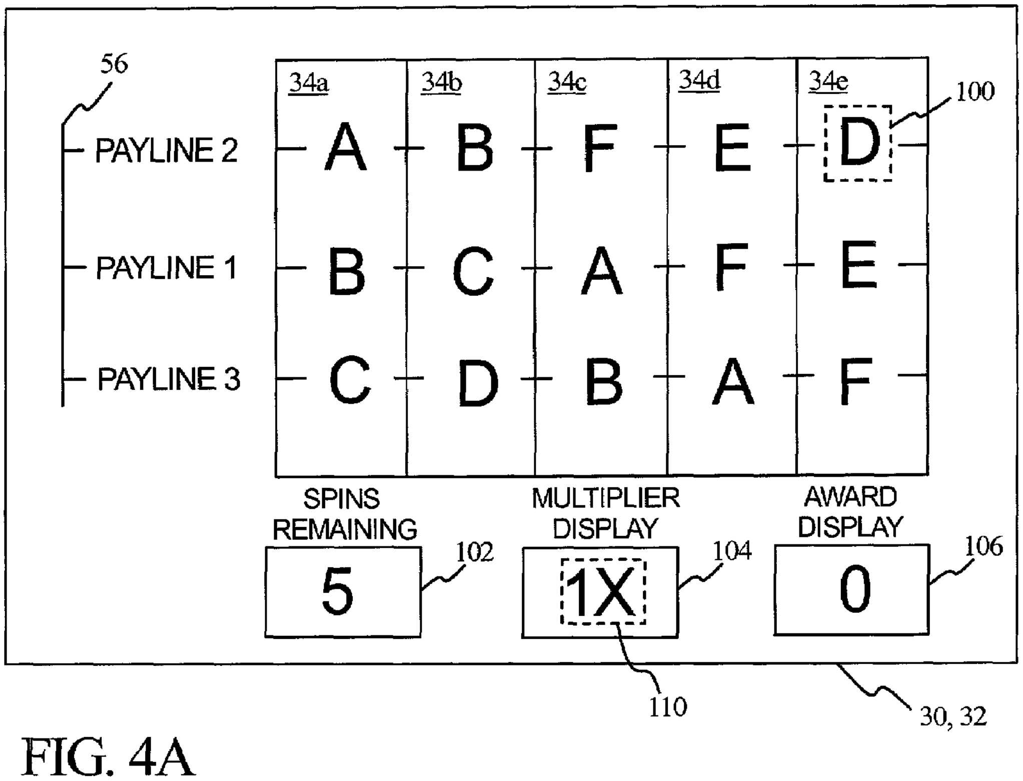
FIG. 3 is an enlarged front elevation view of a display illustrating one embodiment of the present invention.

Referring now to FIG. 3, one embodiment of the present invention includes a plurality of reels 34*a* to 34*e* and one or more associated paylines 56 displayed by a video monitor 30 or 32 (FIG. 1A or 1B). Each reel 34 has a plurality of symbols A through F generally designated by numeral 100. It should be appreciated that the symbols may be any suitable symbol. A spin remaining display 102 initially indicates the number of free spins provided to the player by the processor to start the bonus game. The number of free spins or activations could be predetermined, randomly determined, or based on various factors such as the player's wager in the base game. Thereafter, the spins remaining display 102 indicates the number of free spins remaining in the bonus game. It should be appreciated that the player may be provided with additional free spins during a game, where the free spins are based on the occurrence of one or more symbols on the reels.

The multiplier display 104 displays the multiplier associated with a particular free spin or activation of the reels. In one embodiment, the multiplier associated with each free spin increases by a predetermined amount. In another embodiment, the amount of the increase is an amount selected from a range greater than zero and less than ten after each free spin of the reels. In a further embodiment, the multiplier associated with each free spin increases by a random amount.

The award display 106 displays the total award, or the value of the accumulated awards, during the bonus game. The award value indicated by award display 106 at the end of a game is the award that the player receives for that bonus game.

Referring now to FIGS. 4A through 4E, an example of this embodiment of the present invention is illustrated where the gaming device provides a player with five free spins and a "1×" multiplier to begin the bonus game. In this embodiment, the game starts with a "1×" multiplier. However, it should be appreciated that the game could start with any multiplier desired by the game implementor. It should also be appreciated that the starting multiplier could be randomly determined or based on another factor such as the player's wager in the primary game. It should be appreciated that any pay table or award table may be used in the bonus game. The pay table for this example is as follows: three of the same symbols along payline one awards twenty-five, four of the same symbols along payline one awards fifty, and five of the same symbols along payline one awards one hundred to a player. The bonus game is not limited to payline one and it should be appreciated that another payline or combination of paylines 56 may be used to trigger the bonus award.

In one embodiment, a consolation award is provided to the player if the player does not receive an award after a free spin. In one aspect of this embodiment, the consolation award is predetermined by the processor. In another aspect, the consolation award is randomly determined by the processor. In a further aspect of the present invention, the consolation award is based on the multiplier associated with each free spin of the reels.

In another embodiment, an accumulated award is provided to the player after there are no spins remaining in the game. The accumulated award is based on the awards, if any, provided to the player after each spin. The accumulated award may include a plurality of the awards provided to the player or all of the awards provided to the player.

Figure 4A:
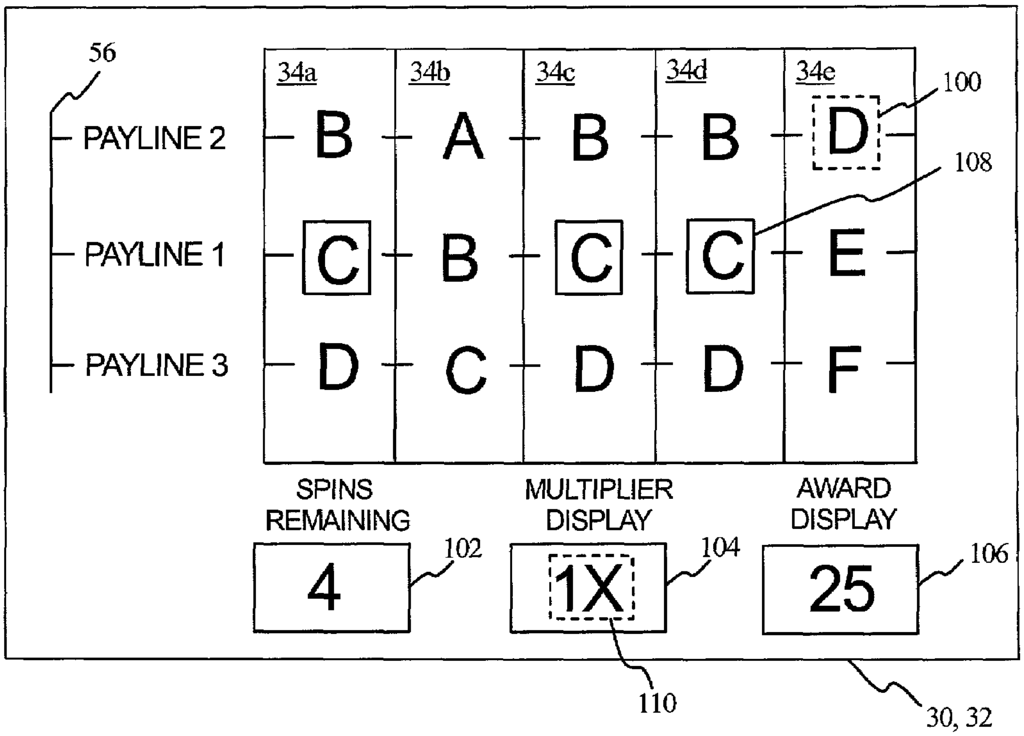
FIGS. 4A to 4E are enlarged front elevation views of a display illustrating an example game of one embodiment of the present invention.

The player starts the secondary or bonus game by spinning the reels. FIG. 4A illustrates the first spin by the player in the bonus game. In the first spin, the player obtained three "C" symbols 108 along payline one. According to the pay table described above, the player receives an award of twenty-five. Because the multiplier 110 is "1×" or multiplies the award value by one, the player's award for that spin remains twenty-five. The award value, twenty-five, is transferred to the award display 106 as illustrated in FIG. 4A. The player now has four spins remaining as shown in spin display 102 as illustrated in FIG. 4A. The processor increments the multiplier by one prior to the next free spin. The multiplier is "2×" for the next free spin.

Figure 4B:
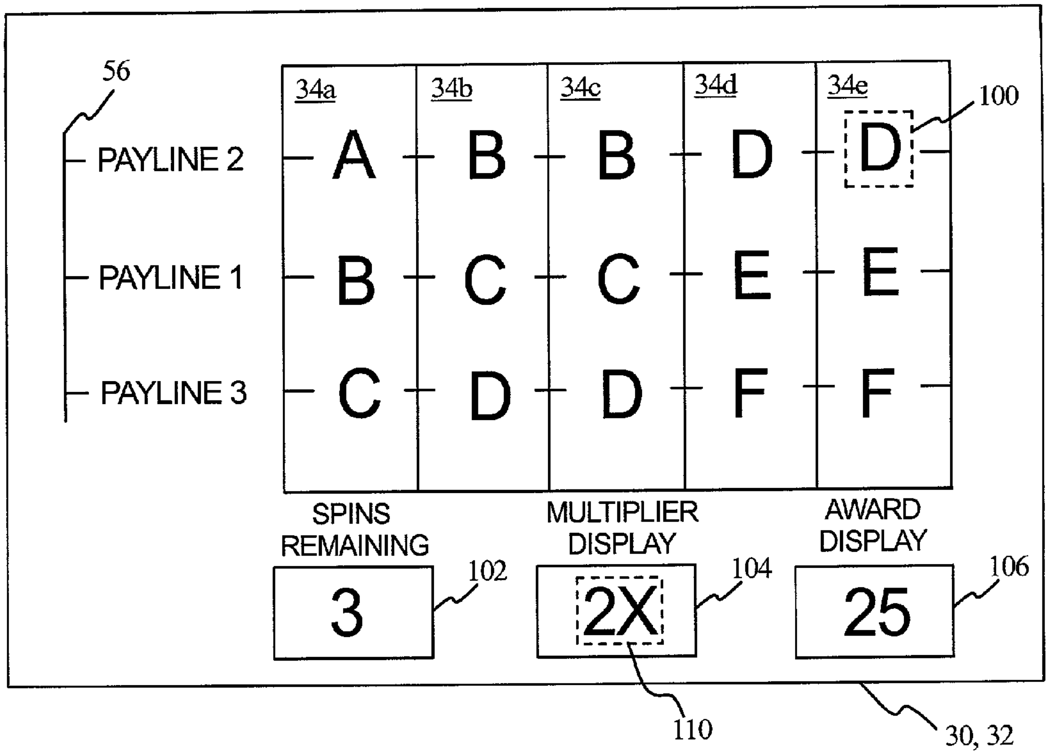

Referring now to FIG. 4B, the player uses their second free spin to spin the reels 34 in the bonus game. After spinning the reels, the player only obtained two "C" symbols and two "E" symbols on payline one. Because this combination of symbols is not an award combination, the player does not receive an award for this spin. Because the player did not obtain an award after the second spin, the player's award total does not change as indicated by the award display 106. The player now has only three spins remaining in the bonus game as indicated by spin remaining display

102. The processor increments the multiplier prior to the next free spin. The multiplier is now "3×."

Figure 4C:
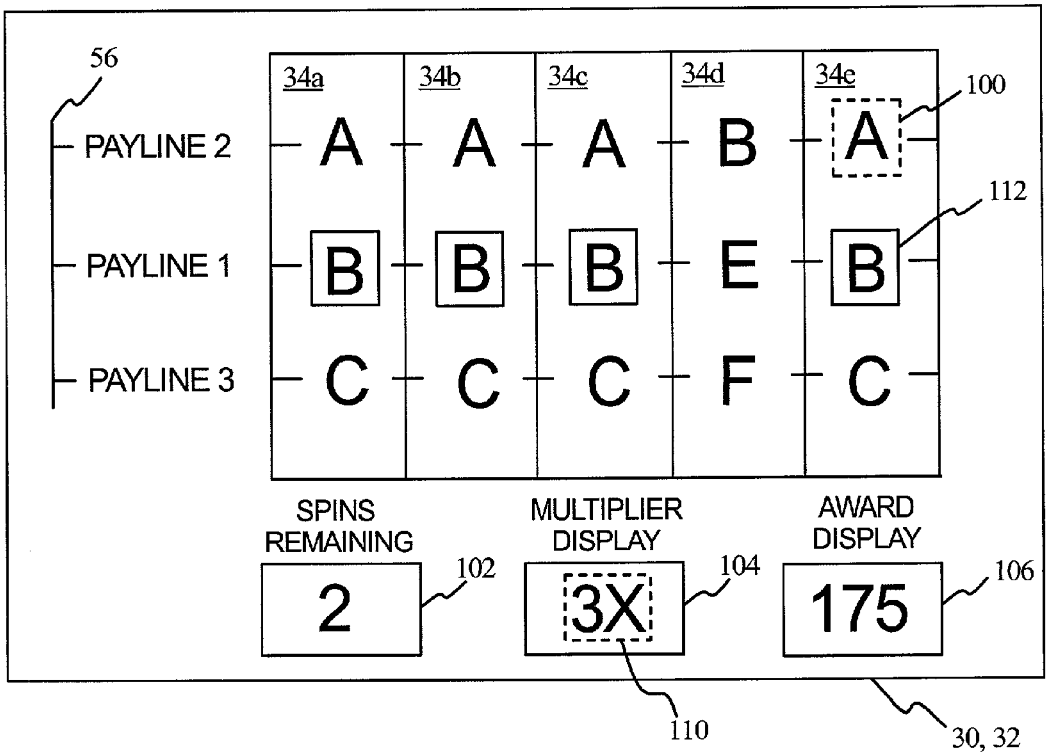

Referring to FIG. 4C, the multiplier 110 for this spin is "3×," or three times an award value, as indicated by multiplier display 104. It should be appreciated that in this embodiment, the multiplier continues to increment by one after each spin, regardless of whether the player obtains an award or not. The multiplier may alternatively change as discussed below. The player spins the reels 34 again and obtains four "B" symbols 112 along payline one. The four "B" symbols provide an award of fifty to the player. In addition, the award value, fifty, is multiplied by three because the multiplier for this spin is "3×." Thus, the player receives a total award of one hundred fifty for the third spin in the bonus game. Furthermore, the award brings the player's total award to one hundred seventy-five as shown in award display 106. This spin shows how a player may accumulate much larger awards based on the incrementing multiplier even though some spins do not result in awards. The player has two free spins remaining as indicated by spin remaining display 102. The gaming device increments the multiplier to "4×" prior to the next free spin.

Figure 4D:
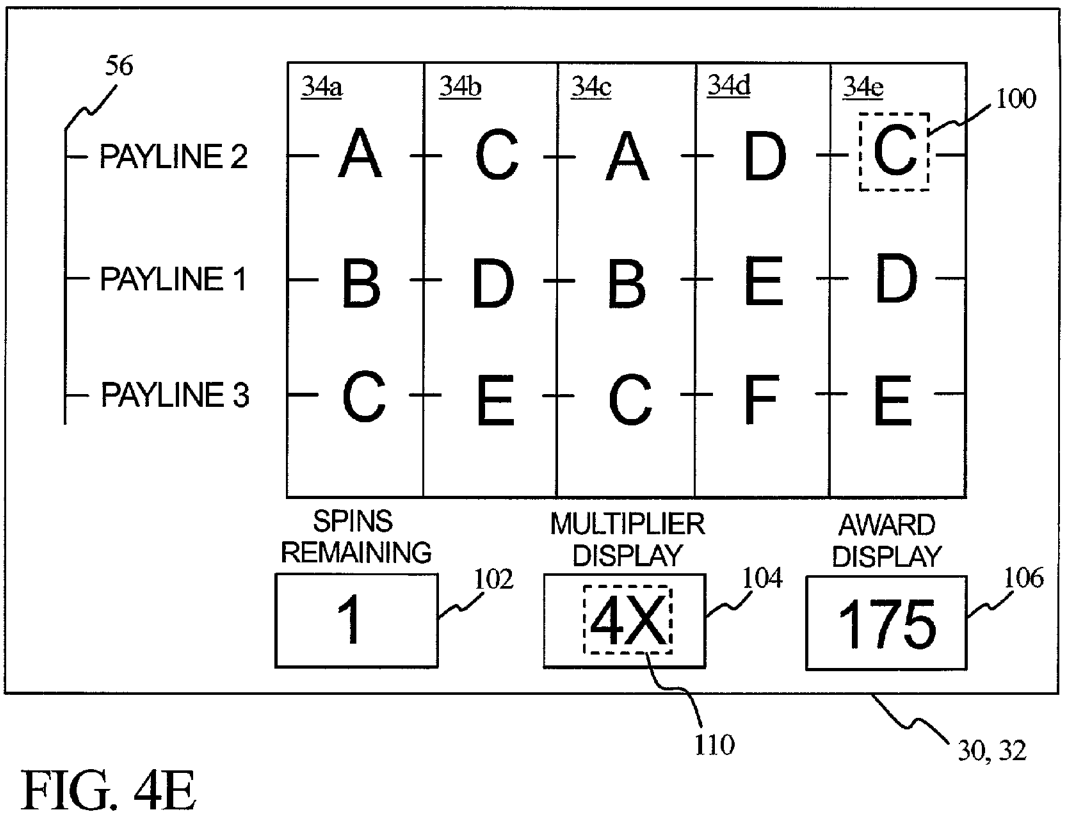

Referring now to FIG. 4D, the potential award for this spin increases substantially because the multiplier 110 continues to increment after each spin. The multiplier is "4×" which will multiply any award that the player receives for this spin by four. The player spins the reels 34, however, the player fails to obtain any award after this spin. The total award, one hundred seventy-five, remains unchanged as shown in award display 106 and the player has only one spin remaining in the bonus game. The gaming device increments the multiplier 110 to "5×" before the next free spin.

Figure 4E:
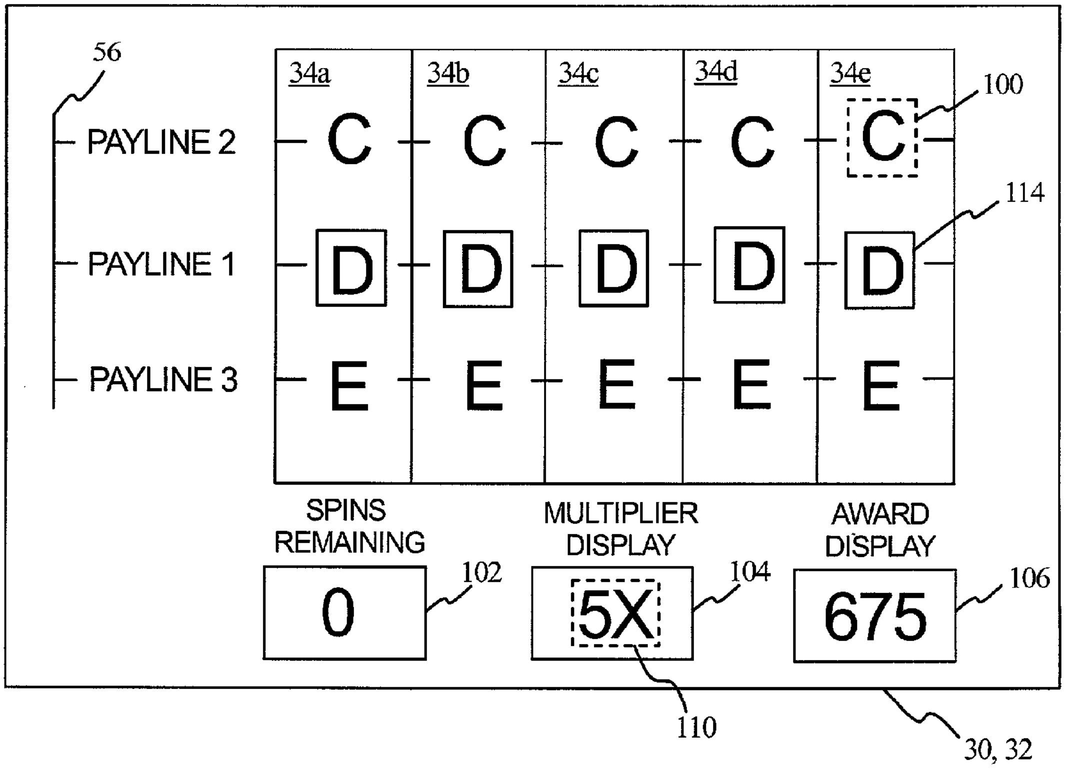

Referring to FIG. 4E, the player spins the reels for the final time in the bonus game. On their final free spin in the bonus game, the player obtained five "D" symbols 114 along payline one. In this particular game, five identical symbols across payline one pays an award of one hundred. Also, the multiplier is "5×" for this spin. Therefore, the award for this spin, one hundred, is multiplied by five to achieve a total award of five hundred for this spin. The award is added to the total award in award display 106 to give the player a final award total of six hundred seventy-five for the bonus game. The player does not have any free spins remaining in the bonus game as indicated by spin remaining display 102. Thus, the bonus game ends. The final spin in this bonus game illustrates how one spin can result in a very large award.

The above example illustrated in FIGS. 4A to 4E, shows how the incremental effect of the multiplier 110 increases the level of player excitement and enjoyment in the bonus game. Potentially, a player might not obtain an award combination on any spin in the bonus game except for the last spin. Since the last spin has a larger multiplier than the previous spins, the player still will receive a large award. Therefore, the player's excitement builds as they progress further into the bonus game of the present invention because the potential for larger awards also builds based on the increasing multiplier.

In one embodiment of the present invention, the multiplier increments after each game, regardless of whether the player obtained a winning combination or not. Because the multiplier continues to increment even after non-winning combinations, the player still may obtain large awards in the bonus game, which increases the player's excitement and enjoyment of the game. For example, a bonus game begins with a multiplier of "1×" and increments by "1×X" after each free spin. If a player does not obtain an award combination until the player's fourth free spin, the player still receives a large award because the multiplier in the fourth free spin is "4×."

In another embodiment of the present invention, the multiplier 110 increases by a predetermined amount that is greater than one after each free spin in the bonus game. For example, the multiplier begins a bonus game at "1×" and increases by "2×" after each free spin of the reels. After the first spin the multiplier increases to "3×," after the second spin the multiplier increases to "5×" and so forth. It should be appreciated that the multiplier can also increase by a predetermined multiplication factor. For example, the multiplier can increase by two or double after each free spin. The multiplier starts the bonus game at "1×" then increases to "2×" after the first free spin, "4×" after the second free spin and so forth. In a further embodiment, the multiplier increases by a random amount after each free spin. The random amount is determined by the processor. In yet another embodiment, the multiplier increases by a predetermined amount after a predetermined number of free spins greater than one. In still a further embodiment of the present invention, the multiplier increases by a random amount after a random number of free spins as determined by the processor.

Figure 5A:
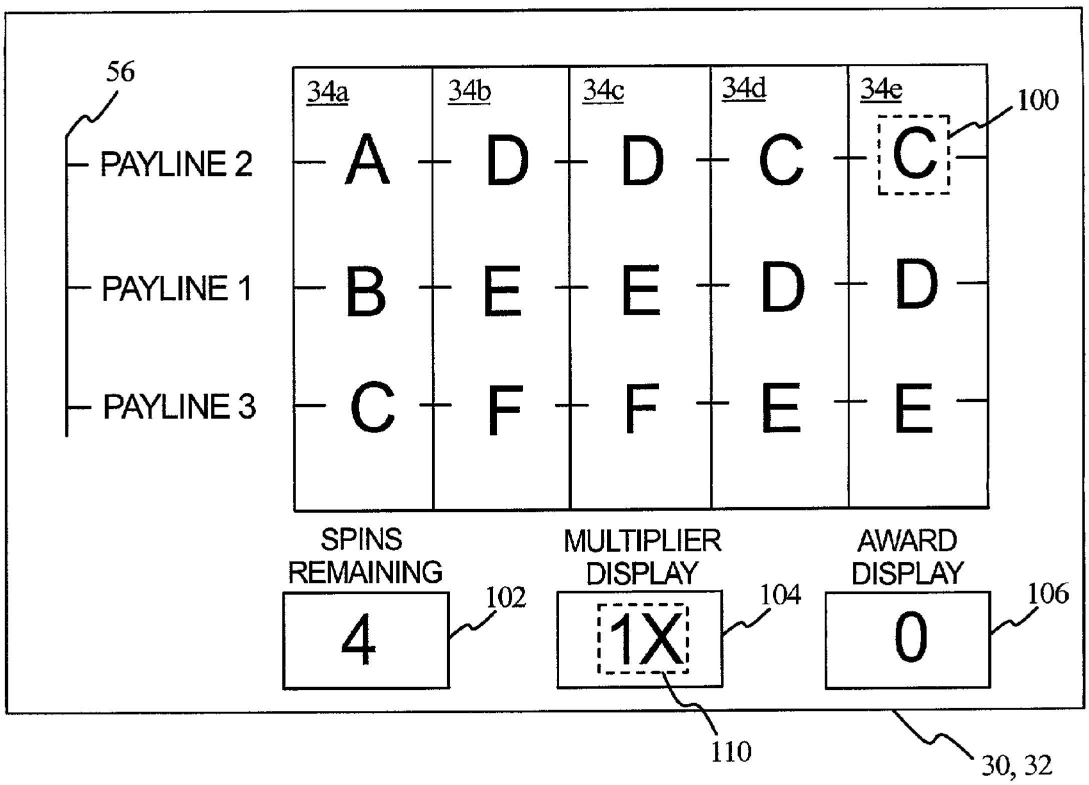
FIGS. 5A to 5D are enlarged front elevation views of another embodiment of the present invention illustrating having one or more incrementor symbols.
Figure 5B:
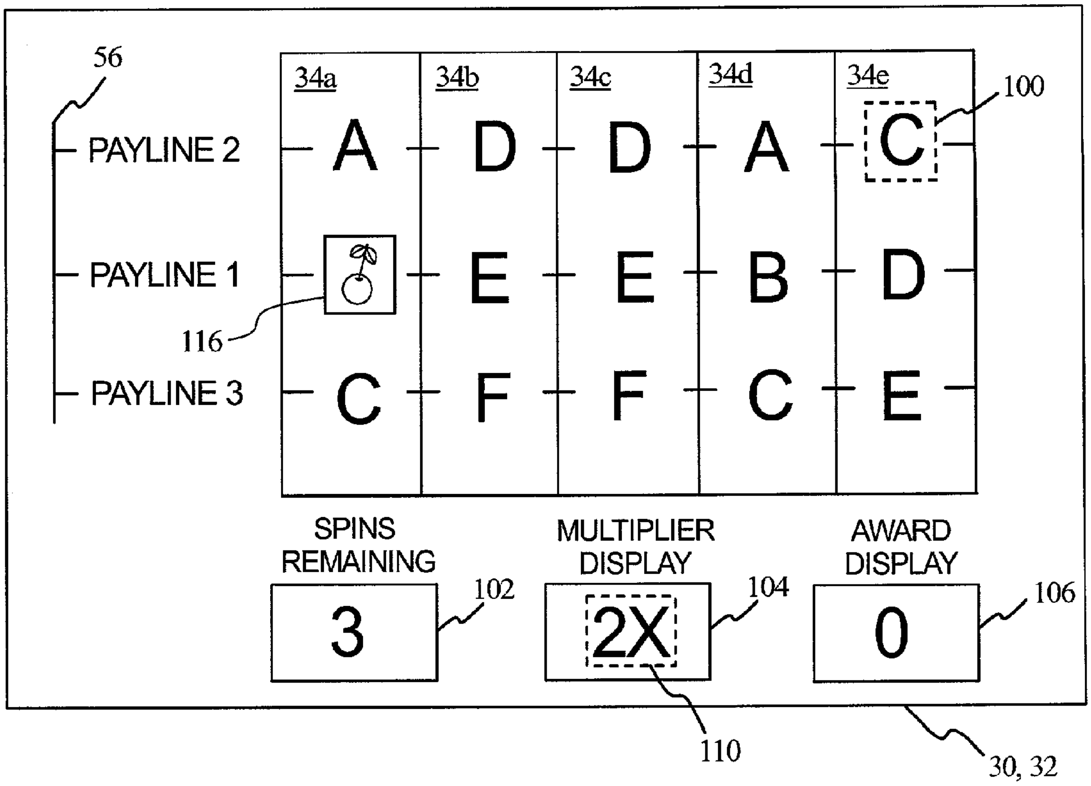
Figure 5C:
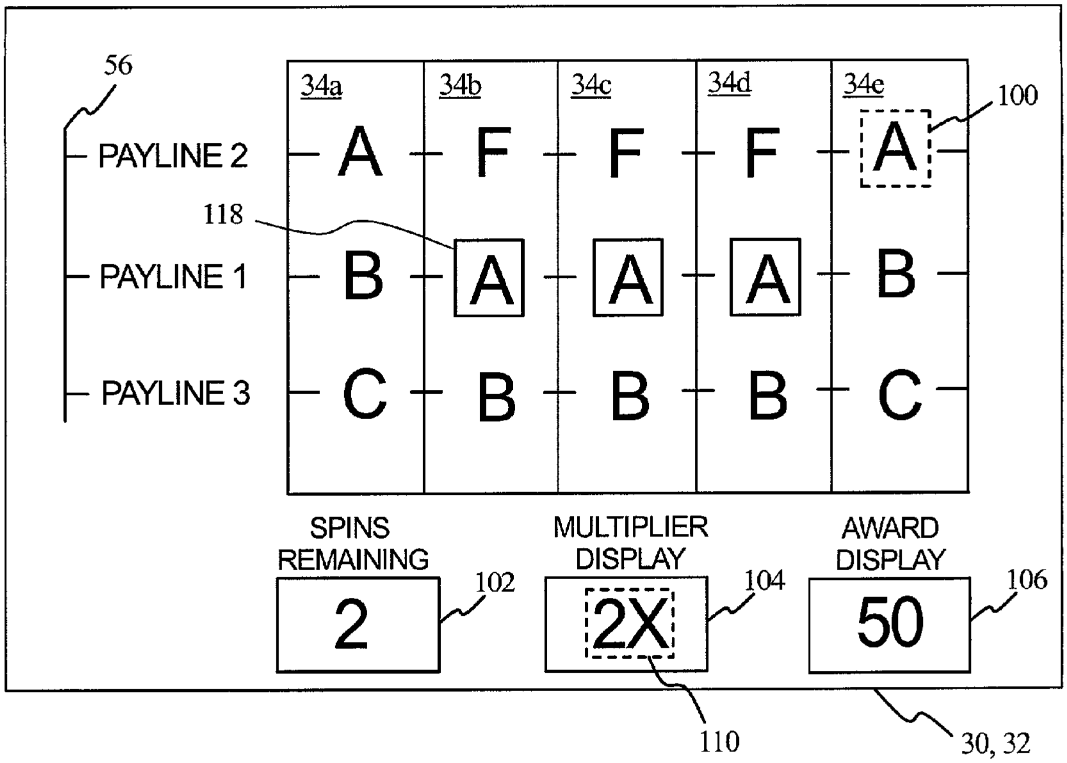

Referring now to FIGS. 5A, 5B, and 5C, another embodiment of the present invention is illustrated where the multiplier 110 additionally or alternatively increments when a particular symbol 100 or a symbol combination appears on the reels or any payline 56 associated with the reels. It should be appreciated that the symbol could appear on a specific payline or in any other manner desired by the game implementor. In this embodiment, the reels include symbols A through F, plus incrementing symbols 116 designated by a cherry symbol in this example. It should be appreciated that the incrementor may be any suitable symbol desired by the game implementor. A player spins the reels 34 attempting to obtain an award plus one or more incrementor symbols 116. The game may display player one incrementor at a time and accordingly increase the multiplier 110 by only one after a spin. However, it is contemplated that a player may receive more than one incrementor in a spin. In one embodiment, the incrementors are associated with probabilities such that one incrementor symbol has a greater probability of appearing on the reels than two or more incrementor symbols. In one embodiment, the multiplier 110 increments only when an incrementor symbol appears on a payline. In one alternative embodiment, there is a weighted probability of increasing the incrementor by more than one when an incrementor symbol is displayed.

In FIG. 5A, the bonus game begins with four spins as indicated by spins remaining display 102, a multiplier of "1×" as indicated by multiplier display 110, and a total award of zero as indicated by the award display 106. In FIG. 5B, the gaming device or player spins the reels 34 and obtains an incrementor symbol 116, designated by a cherry symbol in this example, on payline one. The player does not obtain a winning symbol combination in this spin. Therefore, the total award remains at zero as indicated by the award display 106 and the multiplier 110 increments by one from "1×" to "2×" as indicated by multiplier display 104. The multiplier remains "2×" until the player obtains another incrementor symbol on a payline.

Referring to FIG. 5C, the gaming device or player spins the reels 34 and does not obtain an incrementor symbol, or cherry symbol, on payline one. Therefore, the multiplier 110 remains unchanged as indicated by the multiplier display 104. However, the player does obtain a winning symbol combination in this spin. The winning symbol combination is three "A" symbols 118 on payline one and provides an award of twenty-five. Therefore, the award, twenty-five, is multiplied by the multiplier "2×" to obtain the total award of fifty as indicated by the award display 106. In this embodiment, only the award provided from a particular spin is multiplied by the multiplier for that spin.

Figure 5D:
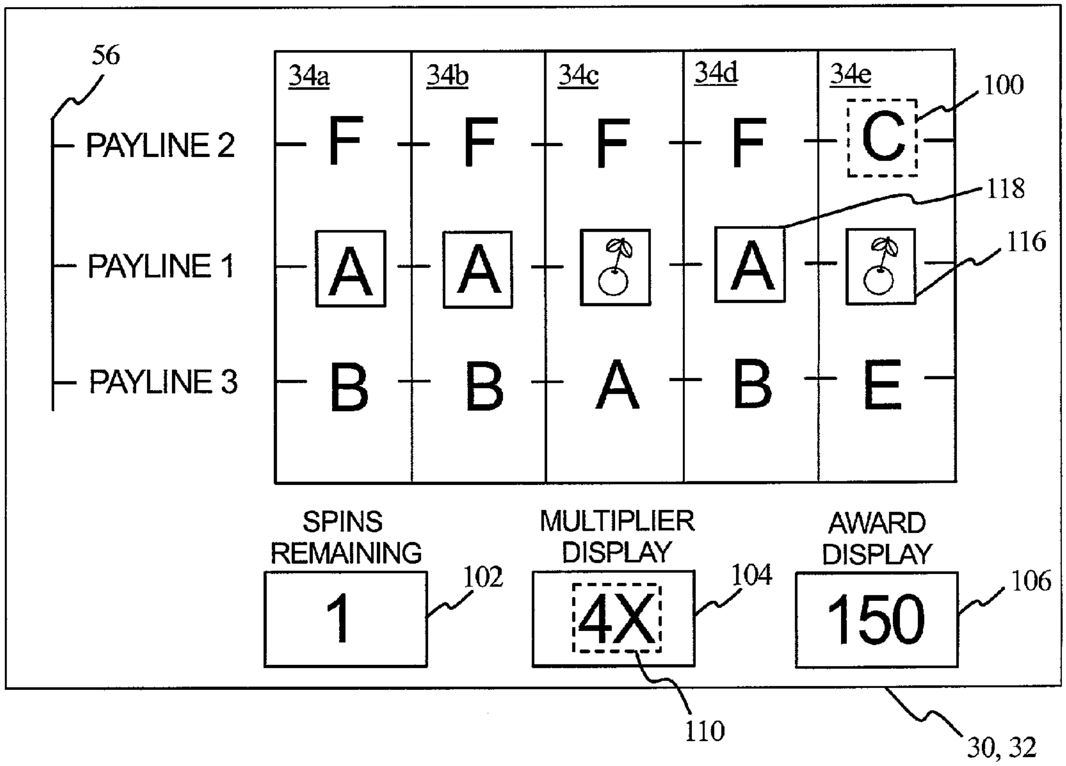

In FIG. 5D, the gaming device or player spins the reels. The player obtains three "A" symbols 118 along payline one. Also, the player obtained two incrementor symbols 116 on a payline in that spin. Thus, the multiplier 110 increments two times (for each incrementor symbol) or from "2×" to "4×." The player's award in the bonus game, twenty-five, is multiplied by four to achieve a total award for this spin of one hundred. The player's new total award in the bonus game becomes one hundred fifty, as indicated by award display 106. The player will continue to spin the reels 34 until there are no spins remaining in the bonus game.

It should be appreciated that the present invention could be employed in other games such as poker, blackjack, keno and other primary or secondary games.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels;

a plurality of symbols on the reels;

a triggering event associated with at least one of said symbols or a combination of said symbols occurring on said reels;

a plurality of free spins of the reels;

a plurality of multipliers associated with the free spins of the reels; and a processor programmed to control the reels, whereupon after the triggering event occurs on the reels, the processor is programmed to:

(i) provide said free spins of the reels to a player, (ii) determine an award, if any, to provide to the player for each free spin based upon the symbols occurring on the reels from said free spin and based on one of the multipliers picked from the plurality of multipliers, (iii) pick at least a first one of the multipliers and a second different one of the multipliers during said plurality of free spins of the reels, and (iv) determine a value of said second different multiplier (a) based on a value of said first multiplier being previously picked (b) independently of said symbols or said combination of said symbols occurring on said reels, and (c) regardless of whether an award was paid to the player in a previous free spin.

2. The gaming device of claim 1, wherein the number of free spins are predetermined.

3. The gaming device of claim 1, wherein the number of free spins is randomly determined by the processor.

4. The gaming device of claim 1, wherein the number of free spins is determined in a sub-game provided to the player by the processor.

5. The gaming device of claim 1, wherein the number of free spins is determined by the player by selecting at least one of a plurality of masked selections controlled by the processor.

6. The gaming device of claim 1, which includes additional free spins provided to the player based on the occurrence of one or more symbols on the reels.

7. The gaming device of claim 1, wherein for each free spin of the reels after a first one of the free spins of the reels, the multiplier picked is greater than the multiplier associated with one of the free spins of the reels that precedes said free spin of the reels.

8. The gaming device of claim 1, wherein the multiplier picked for each sequential free spin of the reels increases by a predetermined amount.

9. The gaming device of claim 8, wherein the multiplier picked for each sequential free spin of the reels increases by an amount selected from a range greater than zero and less than ten after each free spin of the reels.

10. The gaming device of claim 1, wherein the multiplier picked for each sequential free spin of the reels increases by a random amount.

11. The gaming device of claim 1, wherein the multiplier picked for one of the free spins of the reels increases by a random amount after a plurality of free spins of the reels.

12. The gaming device of claim 1, wherein the multiplier picked for each free spin of the reels increases by a randomly determined amount after a predetermined number of said free spins of the reels.

13. The gaming device of claim 1, wherein the multiplier picked for each free spin of the reels increases by a randomly determined amount after a randomly determined number of said free spins of the reels.

14. A gaming device comprising:

a plurality of reels;

a plurality of symbols on the reels;

a triggering event associated with at least one of said symbols or combination of said symbols occurring on said reels;

a bonus round including a plurality of free spins of the reels;

a plurality of multipliers associated with the free spins of the reels; and a processor programmed to control the reels, whereupon after the triggering event occurs on the reels, the processor is programmed to:

(i) provide the bonus round including said free spins of the reels to a player, (ii) increase the multiplier for each free spin of the reels, and (iii) determine an award, if any, to provide to the player for each free spin based on the symbols occurring on the reels from the free spin and the multiplier associated with said free spin of the reels.

15. The gaming device of claim 14, which includes a consolation award provided to the player when the player does not receive an award for at least one of the free spins of the reels.

16. The gaming device of claim 15, wherein the consolation award is predetermined.

17. The gaming device of claim 15, wherein the consolation award is randomly determined.

18. The gaming device of claim 15, wherein the consolation award is based on the multiplier associated with said free spins of the reels from which the player does not receive an award.

19. The gaming device of claim 14, wherein the number of free spins is predetermined.

20. The gaming device of claim 14, wherein the number of free spins is randomly determined.

21. The gaming device of claim 14, wherein the number of free spins is determined In a sub-game provided to the player by the processor.

22. The gaming device of claim 14, wherein the number of free spins is determined by the player by selecting at least one of a plurality of masked selections controlled by the processor.

23. The gaming device of claim 14, wherein said multiplier associated with each sequential free spin of the reels increases by a predetermined amount.

24. The gaming device of claim 23, wherein said multiplier associated with each sequential free spin of the reels increases by an amount selected from a range greater than zero and less than ten.

25. The gaming device of claim 14, wherein said multiplier associated with each sequential free spin of the reels increases by a randomly determined amount.

26. The gaming device of claim 14, wherein the multiplier associated with each free spin of the reels increases by a randomly determined amount after each predetermined number of said free spins of the reels.

27. The gaming device of claim 14, wherein the multiplier associated with each free spin of the reels increases by a randomly determined amount after a randomly determined number of said free spins of the reels.

28. A gaming device comprising:

a plurality of primary reels having primary symbols displayed to a player in a primary game;

a triggering event associated with at least one of said primary symbols or combination of said primary symbols occurring on said primary reefs as a result of spinning the primary reels in the primary game, wherein said triggering event triggers a secondary game;

a plurality of secondary reels having secondary symbols displayed to the player in the secondary game;

at least one incrementor symbol included in the secondary symbols;

a plurality of free spins of the secondary reels provided to a player in the secondary game;

a plurality of multipliers associated with the free spins of the secondary reels in the secondary game; and a processor programmed to:

(i) control the secondary reels.

(ii) increase the multiplier associated with each subsequent free spin of the secondary reels each time one or more of the incrementor symbols occurs on the secondary reels in the free spins, and (iii) determine an award, if any, to provide to the player for each free spin of the secondary reels based upon the secondary symbols occurring on the secondary reels and the multiplier associated with the free spin of the secondary reels.

29. The gaming device of claim 28, which includes an accumulated award based on the awards provided to a player in the secondary game wherein the accumulated award is provided to the player after there are no free spins remaining in the secondary game.

30. The gaming device of claim 29, wherein the accumulated award includes a plurality of the awards provided to the player in the secondary game.

31. The gaming device of claim 29, wherein the accumulated award includes all of the awards provided to the player in the secondary game.

32. The gaming device of claim 28, wherein each incrementor symbol increments the multiplier associated with each free spin of the reels by a predetermined amount.

33. The gaming device of claim 28, wherein each incrementor symbol increments the multiplier associated with each free spin of the reels by a random amount.

34. The gaming device of claim 28, wherein said multiplier increases based on the number of said incrementor symbols that occur in a free spin of the reels.

35. The gaming device of claim 28, a probability of occurring on the reels in a free spin is associated with each incrementor symbol, and wherein one incrementor symbol has a higher probability than another incrementor symbol.

36. A gaming device comprising:

a primary game including at least one triggering event;

a secondary game which includes a plurality of symbols, a plurality of reel events employing said symbols and a different multiplier associated with each reel event; and a processor programmed to control the primary game and the secondary game, whereupon after the triggering event occurs in the primary game, the processor is programmed to:

(i) provide the secondary game to a player, and (ii) for each and every reel event, increase the multiplier after said reel event for every subsequent reel event, and (iii) determine an award, if any, to provide to the player for each reel event in the secondary game based upon the occurrence of the symbols in said reel event in the secondary game and the multiplier associated with said reel event.

37. A method for operating a gaming device, said method comprising the steps of:

(a) initiating a bonus game;

(b) displaying a plurality of reels having a plurality of symbols;

(c) determining a number of free spins of the reels;

(d) spinning the plurality of reels;

(e) determining whether to provide an award to a player based on said symbols displayed as a result of the spinning reels:

(f) modifying said award, if any, using a multiplier;

(g) providing said award to the player;

(h) increasing the multiplier after each free spin in each play of the bonus game for each subsequent free spin; and (i) repeating steps (d) to (h) until there are no free spins remaining.

38. The method of claim 37, wherein said multiplier increases by a predetermined amount after each free spin.

39. The method of claim 37, wherein said multiplier increases by a random amount after each free spin.

40. The method of claim 37, wherein said multiplier increases by a predetermined amount after a plurality of free spins.

41. The method of claim 37, wherein said multiplier increases by a random amount after a random number of free spins.

42. A method for operating a gaming device, said method comprising the steps of:

(a) initiating a bonus game;

(b) displaying a plurality of reels having a plurality of symbols;

(c) determining a number of free spins of the reels;

(d) spinning the plurality of reels;

(e) determining whether to provide an award to a player based on said symbols on the reels displayed as a result of the spinning of the reels;

(f) upon each spinning of the reels increasing a multiplier if the incrementor symbol appears on said reels;

(g) modifying the award using said multiplier; and (h) repeating steps (d) to (g) until there are no free spins remaining.

43. The method of claim 42, wherein each incrementor symbol increases the multiplier by a predetermined amount.

44. The method of claim 42, wherein each incrementor symbol increases the multiplier by a random amount.

45. A gaming device comprising:

a plurality of reels;

a plurality of symbols on the reels;

a triggering event associated with at least one of said symbols or a combination of said symbols occurring on said reels;

a plurality of free spins of the reels;

a plurality of multipliers associated with the free spins of the reels; and a processor programmed to control the reels, whereupon the occurrence of the triggering event on the reels, the processor is programmed to:

(i) provide said free spins of the reels to a player, (ii) determine an award, if any, to provide to the player for each free spin based on the symbols occurring on the reels from said free spin and a picked one of the multipliers associated with said free spin, (iii) pick at least a first one of multipliers and a second different one of the multipliers during said plurality of free spins of the reels, and (iv) determine a value of said second different multiplier (a) based on a value of said first multiplier being previously picked (b) independently of said symbols occurring on said reels, and (c) regardless of whether an award was paid to the player in a previous free spin.

46. A gaming device comprising:

a base game including a plurality of base reels;

a plurality of base symbols included on the base reels;

a triggering event associated with at least one of said base symbols or a combination of said base symbols occurring on said base reels wherein the triggering event triggers a bonus game;

a bonus game including a plurality of bonus reels;

a plurality of bonus symbols included on the bonus reels wherein the bonus symbols are different from the base symbols;

a plurality of free spins of the bonus reels;

a plurality of multipliers associated with the free spins of the bonus reels; and a processor programmed to control the base and bonus reels, whereupon the occurrence of the triggering event on the base reels, the processor is programmed to:

(i) initiate the bonus game, (ii) provide said free spins of the bonus reels to a player, (iii) determine an award, if any, to provide to the player based upon the bonus symbols occurring on the bonus reels after each free spin and the multiplier associated with each free spin, and (iv) change a value of the multiplier to a predetermined amount at least once during the free spins of the bonus reels (a) based on a value of the previous multiplier (b) independently of said symbols occurring on said reels, and (c) regardless of whether an award was paid to the player in a previous free spin.

* * * * *